May 28, 1968

I. BRATER ETAL 3,385,306

PORTABLE DISHWASHING MACHINES

Filed June 17, 1966

INVENTORS
IRWIN BRATER
DESMOND J. MEEHAN

BY *Abraham A. Saffitz*

ATTORNEY

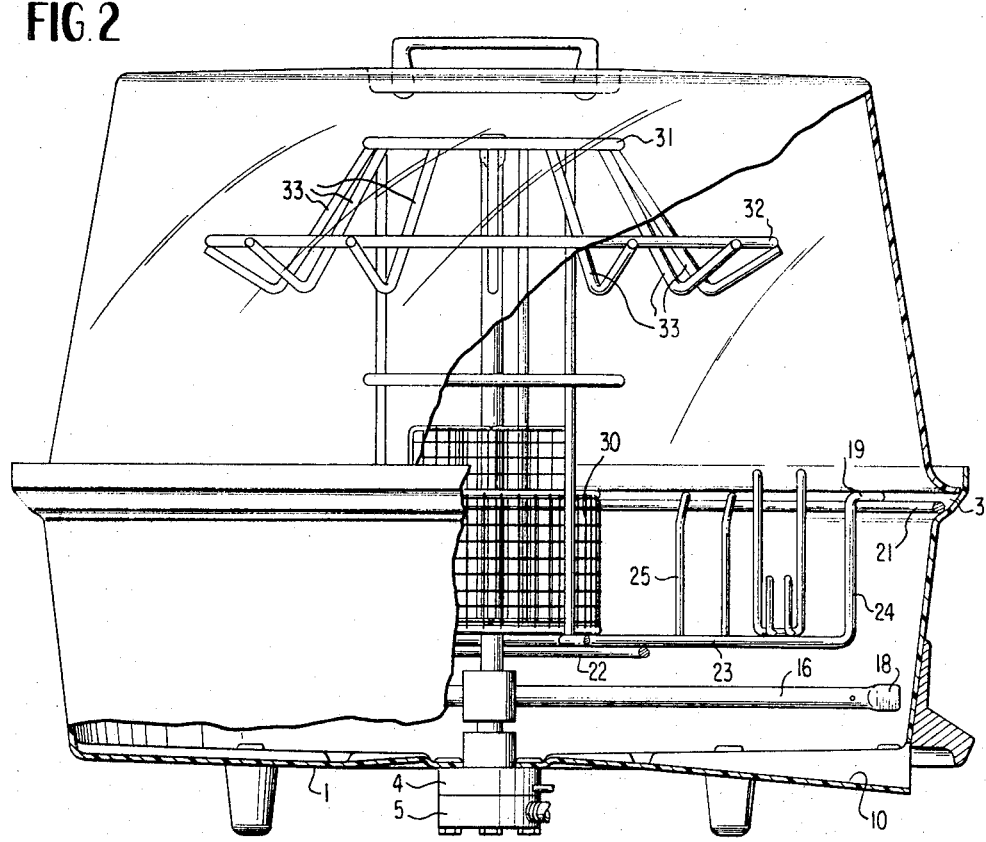
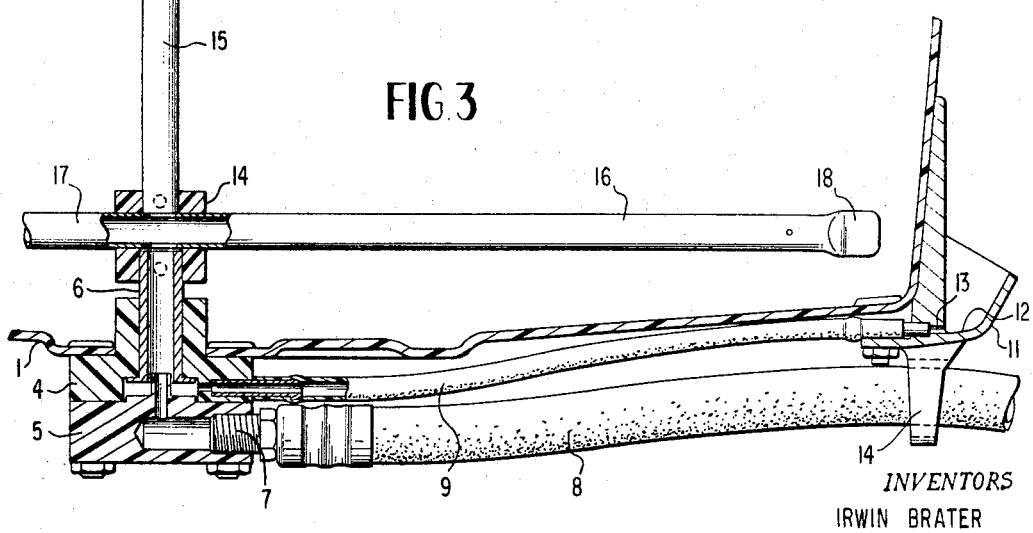

INVENTORS
IRWIN BRATER
BY    DESMOND J. MEEHAN

ATTORNEY 3,385,306
PORTABLE DISHWASHING MACHINES
Irwin Brater, 230 5th Ave. 10001, and Desmond J. Meehan, 527 Madison Ave. 10022, both of New York, N.Y.
Filed June 17, 1966, Ser. No. 558,395
5 Claims. (Cl. 134—93)

This invention relates to a light-weight household dishwasher operated by the water flowing through it and utilizing no other power means. The upper half of the dishwasher is a removable transparent cover enabling the user to watch the operation of the device. Warning means are provided to permit stopping the operation when the temperature of the water falls below a desired value. The machine is made of light but strong plastic material whereby it may be readily moved about.

In the drawing forming a part of this application:

FIG. 1 is a plan view of the washing machine as it appears with the cover removed;

FIG. 2 is a vertical sectional view of the machine along the section line 2—2 of FIG. 1;

FIG. 3 is an enlarged vertical sectional view of approximately one-quarter of the pan structure and shows the water supply means and spray unit;

Figure 4:
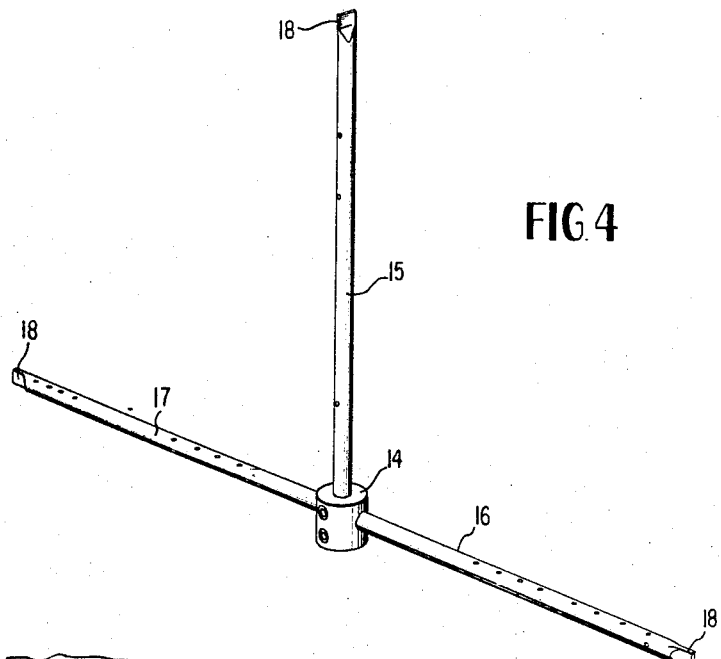
FIG. 4 shows the spray unit in perspective.

The washing machine includes a casing comprising a main base pan 1 and a removable transparent cover 2. Within the wall of the pan near the upper edge of the wide angle opening thereof is formed a ledge 3 which is directed outwardly and then upwardly and upon which the cover is placed.

The transparent cover 2 consists of impact-resistant light-weight, heat-resistant, detergent-proof and water-resistant molded or cast thermosetting plastic such as polycarbonate resin available under the trademark designation "Delrin," epoxy resin under the designation "Epon 1007," polyoxy methylene resin of high melting point 140–180° C. and polyethylene terephthalate under the designation "Mylar." There can also be used internally reinforced high impact, high styrene resins based on mixtures of polystyrene, butadiene-acrylonitrile copolymer and urethane polymer, as shown in U.S. Patent No. 3,049,505.

From the ledge 3, a basket, to be hereinafter described, is suspended. The base pan is provided with a number of spaced short legs upon which it is supported. Through the center of the bottom of the pan extends a bearing member 4 which is shaped as an inverted T in vertical section, and to the lower enlarged portion thereof, outside of the pan, is attached the disc 5 by any means, such as bolts and nuts. The members 4 and 5 are centrally arranged in the pan 1 and are held stationary therein. Within the vertical portion which is the bearing proper is located a tubular shaft 6. The disc 5 is provided with an opening communicating with the tubular shaft 6 and, by means of coupling 7, the tubular shaft 6 is connected to the flexible hose 8 which, when the dishwasher is in operation, is connected to a hot water supply. A tubular opening, provided in the flange 4, holds tube 9 and this tube 9 is connected at its outer end to the detergent dish.

The bottom of the casing 1 is provided with an indented groove or channel 10 radiating from the center of the casing bottom and leading to a drain opening in the casing. Outside of the casing and at its lower end is attached the casting 11. This casting, to one end thereof, is formed to provide the detergent well 12 and the other end constitutes a downwardly and outwardly extending baffle plate 12a facing the drain opening below the casing. The well 12 has at the intersection of the bottom of the well and its inner vertical wall a fine orifice 13 which is connected with the tube 9.

The spray unit is mounted on the tubular shaft 6 and consists of a short vertical tube 14 which carries a vertical tube 15 and two horizontal tubes 16 and 17. The tubes 15, 16 and 17 are closed at their extended terminal ends and each is provided with a series of fine orifices, those in the horizontal tubes opening upwardly.

The basket 20 is removably mounted within the pan 1 and is suspended from the ledge 3. This basket consists of a large circular member 21 made of rigid wire and below it and concentrical with it is a small circular member 22. The two circular members are interconnected by dish-supporting members, thus forming an integral unit. These dish-supporting members have horizontal parts 23 connected to the lower small circular member and vertical members 24 rising to the larger circular member lying upon ledge 3 of the pan 1. The horizontal portion of the dish supports have vertical fingers 25 extending upwardly which hold the articles to be washed. These fingers 25 are particularly useful to hold cups and deep dishes in place during the washing and rinsing cycles.

The dish-supporting members are so formed that they leave space and support for another essentially vertical support of articles to be washed. At the bottom, and fitting between the vertical fingers of the first set of supports, is a flatware holder screen basket 30 and above it, a circular cup rack holder for cups and other items to be washed. This circular holder is smaller than the one described above but structurally it also consists of two circular bases 31 and 32; one above the other, the upper base 31 being smaller than the lower one 32 and interconnected by substantially vertically placed struts 33 circumferentially arranged between the two circular bases. As seen in FIG. 3, the struts form a pocket to support the cups or other items. The screen basket and the circular holder form a rigid unit that can be readily placed within or removed from the lower basket.

Figure 5:
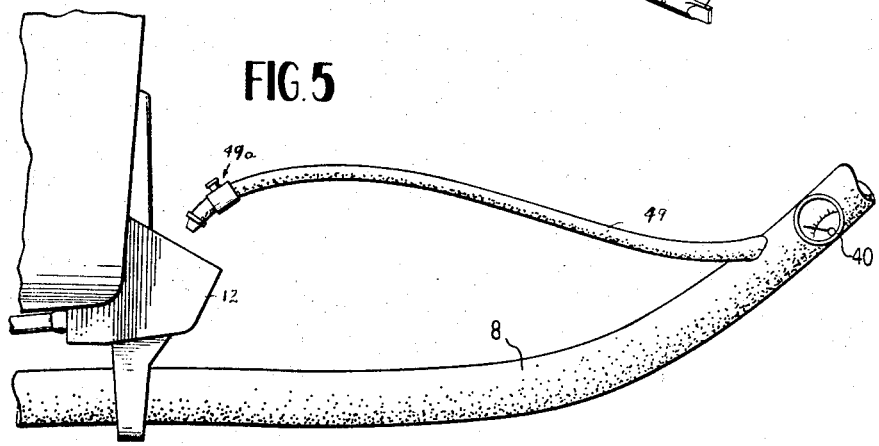
FIG. 5 shows the hose support.
Figure 6:
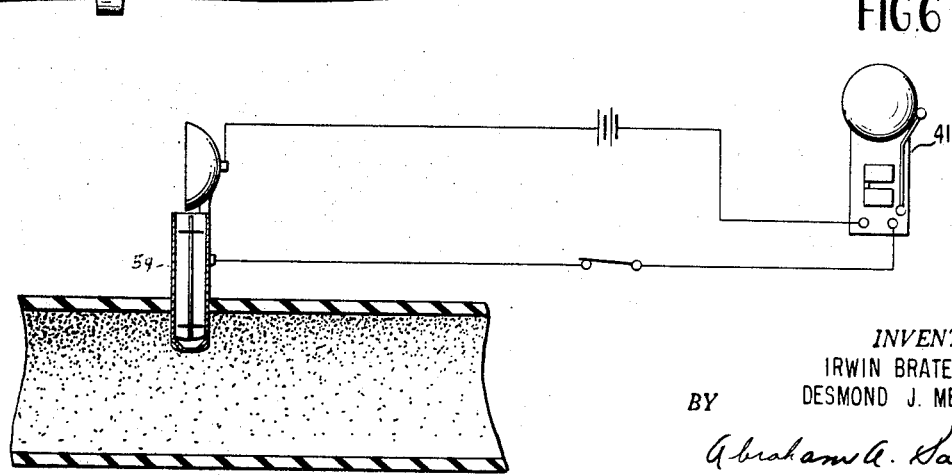
FIG. 6 shows the alarm system.

To control the temperature of the water coming into the washing machine, various devices may be provided. FIG. 5 shows a thermostatic device 40 connected in the hose 8. FIG. 6 shows a thermostatically operated bell 41 which will ring should the temperature of the water fall below a desired value.

The detergent well 12, as shown in FIGS. 3 and 5, can be flushed with hot water from bypass tube 49, and the push-button spray faucet 49a serves to clean the inside corners of the well to thereby assure that all of the detergent which is dropped into the well feeds directly into the line 9 and to the venturi at the central discs 5 and 4 for mixing and for operation of the rotating spray tube 16.

The push-button spray faucet 49a has the advantage of permitting accurately controlled addition in the well 12 of germicide, detergent, rinse, or water softening agent, these in any desired sequence or combination, with a very efficient mechanical cleansing operation being carried out by water flush between each separate addition.

The operation of the dishwasher is well-suited to save hot water and is also adapted to be connected to a hot water source, such as a kettle of hot water which is being boiled over an open fire, as well as with any household hot water source. The former hot water source, e.g., kettle on an open fire, can be fed into a drum serving as a gravity reservoir to feed into main line 8, and the temperature measuring device, thermometer 40, will indicate that the temperature of the boiling water is adequate.

If the conditions are such that it is not convenient to visually monitor the water temperature, the bell sounding device, illustrated in FIG. 6, may be employed, the bell sounding unit 41 being energized when the expansion of the bimetal temperature actuating unit 59 is adequate to sound the bell attached thereto. This thermostatic warning device 59 is that which is shown in FIG. 3 of Simmons et al. Patent No. 2,660,143. If the noise is not to be sounded after a first warning click, a remote bell 41 furnishes an additional warning. The circuit for the bi-metal element 59 and the bell element 41 is a conventional circuit as shown in FIG. 6.

The main base pan 1 is preferably formed of a detergent-proof, heat-resistant, synthetic plastic, which is impact-resistant and is preferably made of thermoset resin. A preferred example is melamine formaldehyde resin mixed with silicone resin, or modified formaldehyde resin which is plasticized with a short oil alkyd resin. The aforesaid silicone melamine alkyd resin composition is commercially available in the form of molding powder or injection molding, and post-forming. The structural unit may also be made by slush molding and curing the aforesaid composition, which is dispersed in a volatile solvent. The aforesaid composition, after curing, provides a high-impact, resistant structure which, when filled with titanium dioxide filler, chopped fiberglass and calcium carbonate filler, is extremely heat-resistant and free from distortion.

The filler proportions may be selected to make the base casing 1, which is in slightly greater thickness than the cover 2, to provide substantial stability despite the fact that the total weight is not great. The weight of he commercially successful model of the present dishwashing machine is about 11 lbs. and the cover represents less than about one-sixth down to one-tenth of the total weight, empty and filled. The truncated trapezoidal section of the cover 2, which represents about three-fifths of the height of the machine, contributes to the stability and squat appearance. The diameter of both the cover and the pan is at least twice the height of each of these, separately, so that the loaded machine, when partly filled, has little tendency to walk (on the drainboard) when the hose 8 is subjected to the 30–60 lbs. water pressure from the household tap.

Contributing an important new feature to the basket 20 are the fingers 25, shown in FIG. 3, and which are spaced along the horizontal struts 23, these fingers being spaced apart to accommodate the edges of cups and dishes to hold them in place during the washing and rinsing cycles.

The horizontal structure 23, the upper circle 32 and the lower circle 31 are each formed of metal which is coated with detergent-proof, impact-resistant, and heat-resistant plastic. The plastic may be thermosetting or it may be a vulcanized elastomer, such as a peroxide vulcanized tripolymer of butadiene styrene and cyclopentadiene, which is commercially available from the Du Pont Company and from the Standard Oil Company.

It is preferred to utilize heavy wire of about 1/8 to 1/4 inch diameter for the structural supporting elements 31 and 32, while the reinforced spacers 25 are formed of lighter wire.

In the present dishwasher operation, there are substantially no moving parts to contend with, and there is no possibility that the dishwasher will flood because of the sloped construction of the drain bottom 10, and because of the ease of inspection through the transparent cup. The faucet 49a is operable at very low pressure to flush the drain clean and the dishwashing machine can be used at minimum cost since it does not require investment for pumps, electronic controls to open the detergent feeder, thermostat switches, nor does the unit require a high degree of training for repairs.

Having thus described the invention, what is claimed is:

1. A lightweight portable dishwashing machine including a deep base pan tapering and opening upwardly, a ledge formed near the upper edge of the pan, a transparent heat-resistant synthetic plastic cover, deeper than the pan, tapering and opening downward, mounted on said ledge of the pan, the pan and cover when assembled defining a space and the pan being heavier than the cover, a hollow bearing member extending through the center of the bottom of the pan, a detergent well integral with and attached to the lower portion and outside of the pan, a vertical tubular shaft extending from the top of the bearing into said space, a hollow disc attached to said bearing member outside and in close contact with the pan, said disc provided with an opening communicating with said vertical shaft and with two other radial openings, a water supply hose connected with said vertical hollow shaft, a smaller tube connecting said hollow shaft with said detergent well, a rotatable spray unit mounted on the tubular shaft and fed by said water supply hose and comprising a vertical tube and two radially extending horizontal tubes, all the tubes closed at their outer ends and each provided with a series of fine orifices, a basket suspended from the ledge of the pan, said basket embodying vertical and horizontal elements to receive and hold articles to be washed, said pan formed of heat-resistant thermosetting resin and said basket structure formed of light impact-resisting and detergent-proof elastomeric material thereby rendering the washing machine stable against tipping when empty and when filled with dishes.

2. A dishwashing machine as described in claim 1, wherein the bottom of the pan casing is provided with a downwardly sloping, indented groove forming a channel radiating from the center of the casing bottom and widening to form a drain of the casing.

3. A machine as described in claim 1 wherein temperature measuring means is provided in said water supply hose to determine when the temperature of the water falls below a desired value, and wherein a bypass hose is provided to flush said detergent well.

4. A machine as described in claim 1 including temperature registering means comprising an alarm system mounted on the hose and set in operation when the temperature drops below a preset value.

5. A machine as defined in claim 1 wherein said basket consists of two circular members, one above the other, the lower one being of smaller diameter, said circular members interconnected by vertical members and carrying fingers to hold articles being washed.

References Cited

UNITED STATES PATENTS

| | | | |
|---|---|---|---|
| 2,702,558 | 2/1955 | Blanchard | 134—93 XR |
| 3,203,436 | 8/1965 | Wallgren et al. | 134—100 XR |

FOREIGN PATENTS

| | | |
|---|---|---|
| 380,316 | 9/1964 | Switzerland. |

CHARLES A. WILLMUTH, *Primary Examiner.*

ROBERT L. BLEUTGE, *Examiner.*